United States Patent
Ding

(10) Patent No.: US 9,551,472 B2
(45) Date of Patent: Jan. 24, 2017

(54) ROTARY ELECTRONIC CANDLE

(71) Applicant: Nantong Ya Tai Candle Arts & Crafts Co., Ltd., Nantong, Jiangsu Province (CN)

(72) Inventor: Yingqi Ding, Nantong (CN)

(73) Assignee: NANTONG YA TAI CANDLE ARTS & CRAFTS CO., LTD., Nantong (CN)

( * ) Notice: Subject to any disclaimer, the term of this patent is extended or adjusted under 35 U.S.C. 154(b) by 0 days.

(21) Appl. No.: 14/832,943

(22) Filed: Aug. 21, 2015

(65) Prior Publication Data

US 2016/0178149 A1   Jun. 23, 2016

(30) Foreign Application Priority Data

Dec. 23, 2014 (CN) .................. 2014 2 0818387 U

(51) Int. Cl.
| | | |
|---|---|---|
| F21S 10/04 | (2006.01) | |
| F21S 6/00 | (2006.01) | |
| F21S 9/02 | (2006.01) | |
| F21S 10/06 | (2006.01) | |
| F21V 13/04 | (2006.01) | |
| F21V 23/04 | (2006.01) | |
| F21V 8/00 | (2006.01) | |
| F21W 101/00 | (2006.01) | |
| F21W 121/00 | (2006.01) | |
| F21Y 101/00 | (2016.01) | |

(52) U.S. Cl.
CPC ............. *F21S 10/046* (2013.01); *F21S 6/001* (2013.01); *F21S 9/02* (2013.01); *F21S 10/063* (2013.01); *F21V 13/04* (2013.01); *F21V 23/04* (2013.01); *G02B 6/0006* (2013.01); *F21W 2101/00* (2013.01); *F21W 2121/00* (2013.01); *F21Y 2101/00* (2013.01)

(58) Field of Classification Search
CPC ........ F21S 10/046; F21S 6/001; F21S 10/063; F21S 9/02; G02B 6/0006; F21V 13/04; F21V 9/02; F21W 2010/00; F21Y 2101/00
USPC .......... 362/810, 565, 282, 253, 35, 234, 235
See application file for complete search history.

(56) References Cited

U.S. PATENT DOCUMENTS

| | | | | |
|---|---|---|---|---|
| 5,309,338 A | * | 5/1994 | Liu ........................ | A61L 9/122 362/253 |
| 5,513,084 A | * | 4/1996 | Simpson ............ | A47G 33/0809 362/284 |
| 7,473,002 B1 | * | 1/2009 | Chen ...................... | F21S 10/00 362/283 |
| 8,556,476 B2 | | 10/2013 | Ding | |

(Continued)

*Primary Examiner* — Laura Tso
(74) *Attorney, Agent, or Firm* — Loza & Loza, LLP; Michael F. Fedrick

(57) ABSTRACT

A rotary electronic candle, including a candle body having a hollow cavity with a candle wick, the candle wick including a battery box base, a plurality of fixing columns, a motor fixing ring, a cover plate, a motor, a rotating shaft, a light source plate and a hemispherical cover. The fixing columns are fixed at the upper end of the battery box base, the motor fixing ring is located between the plurality of fixing columns, and the cover plate is covered on the upper end face of the motor fixing ring. A through hole is formed in the center of the cover plate, the motor is installed in the motor fixing ring, the rotating shaft is connected with the motor shaft of the motor and penetrates through the through hole, and the light source plate is fixed on the cover plate.

7 Claims, 4 Drawing Sheets

(56) References Cited

U.S. PATENT DOCUMENTS

| | | | |
|---|---|---|---|
| 8,585,234 B2 | 11/2013 | Ding | |
| 8,628,208 B1* | 1/2014 | Yang | F21S 10/043 |
| | | | 362/161 |
| 8,695,247 B1* | 4/2014 | Yang | G09F 13/24 |
| | | | 362/101 |
| 8,960,938 B2* | 2/2015 | Yang | F21S 10/002 |
| | | | 362/101 |
| 9,074,741 B2 | 7/2015 | Ding | |
| 9,267,660 B1* | 2/2016 | Wang | F21V 5/04 |
| 9,395,061 B2* | 7/2016 | Yang | F21V 1/10 |
| 2008/0117633 A1* | 5/2008 | Li | G11B 33/045 |
| | | | 362/253 |
| 2012/0307517 A1 | 12/2012 | Ding | |
| 2015/0124442 A1 | 5/2015 | Ding | |
| 2015/0124474 A1 | 5/2015 | Ding | |

\* cited by examiner

ROTARY ELECTRONIC CANDLE

CROSS-REFERENCE TO RELATED APPLICATIONS

This Application claims the benefit of priority under 35 U.S.C. §119 from Chinese Utility Model Patent Application No. 201420818387.7, filed on Dec. 23, 2014. The disclosure of this application is incorporated herein by reference in its entirety.

FIELD OF THE INVENTION

The invention relates to an electronic candle, and particularly relates to a rotary electronic candle with a rocking candle wick.

BACKGROUND OF THE INVENTION

Candles are decorative daily necessities. Traditional candles are mainly used for lighting and are achieved by burning wax oil. Candles gradually become shorter due to combustion and are used up finally, meanwhile with the development of society, the function of candles is no longer limited to lighting, but also plays the role of decorating and adding to atmosphere, for example on birthday parties, friend dinners, and dates. Several candles can be lighted to add a romantic atmosphere due to the sparkly candlelight. However, burning candles are not only troublesome, but also have large potential safety hazards. In view of this, electronic candles are proposed, but most electronic candles can only emit light and can play music at most, and the ornamental value is too low to meet the needs of people at present.

SUMMARY OF THE INVENTION

The purpose of the invention is to provide a stereoscopic and dynamically changing rotary electronic candle for solving the deficiencies in the prior art.

Technical solution: a rotary electronic candle, including a candle body, wherein a hollow cavity is arranged in the candle body, an electronic candle wick is filled in the hollow cavity, the candle wick includes a battery box base, a plurality of fixing columns, a motor fixing ring, a cover plate, a motor, a rotating shaft, a light source plate and a hemispherical cover, the plurality of fixing columns are fixed at the upper end of the battery box base, the motor fixing ring is located between the plurality of fixing columns and is fastened by a fastener, the cover plate is covered on the upper end face of the motor fixing ring and is clamped by a clamping element, a through hole is formed in the center of the cover plate, the motor is installed in the motor fixing ring, the rotating shaft is connected with the motor shaft of the motor and penetrates through the through hole, the light source plate is fixed on the cover plate and is connected with a battery box through a power line, the upper end of the rotating shaft is of an internal thread structure, and the hemispherical cover is screwed and installed above the rotating shaft through a screw and covers the light source plate therein.

The battery box base is fixed on the lower end face of the candle body through a fastener, and a switch is installed on the lower end face of the battery box base.

Reinforcing ribs are arranged on both sides of each fixing column.

The light source plate is of an annular structure, six LED lamps in two groups are arranged on the light source plate, and the rotating shaft is inserted into the middle of the light source plate.

The hemispherical cover is formed by a plurality of triangles which are bent and spliced in different angles, such that light irradiated thereon is refracted and reflected towards different directions, and with the rotation of the hemispherical cover, the refracted light continuously rotates.

The candle body is provided with an inner layer and an outer layer, the inner layer is of a nonopaque (i.e., transparent or translucent) ceraceous structure, the outer layer is made from plastic, glass, acrylic or ceramic with a mirror surface effect, and a variety of nonopaque dynamic graphics are spray coated on the surface of the outer layer.

An optical fiber lamp wick is arranged at the center of the upper end face of the candle body, a through hole is formed in the lower end of the candle body, the candle wick is inserted into the hollow cavity from the through hole in the lower end of the candle body, and the optical fiber lamp wick is connected with the light source plate.

Beneficial effects: in the rotary electronic candle of the present invention, the candle wick is arranged to be rotatable, a semicircular cover is used for continuously refracting the light to disperse the light to various directions, a variety of nonopaque dynamic graphics are spray coated on the external candle body to irradiate the internally dispersed light onto the graphics on the candle body, and in combination with the rotation of the semicircular cover, the irradiated light dynamically changes, and the stereoscopic effect is strong.

DETAILED DESCRIPTION OF THE EMBODIMENTS

A detailed illustration of the invention will be given below in combination with the accompanying drawings.

Embodiment 1

Figure 1:
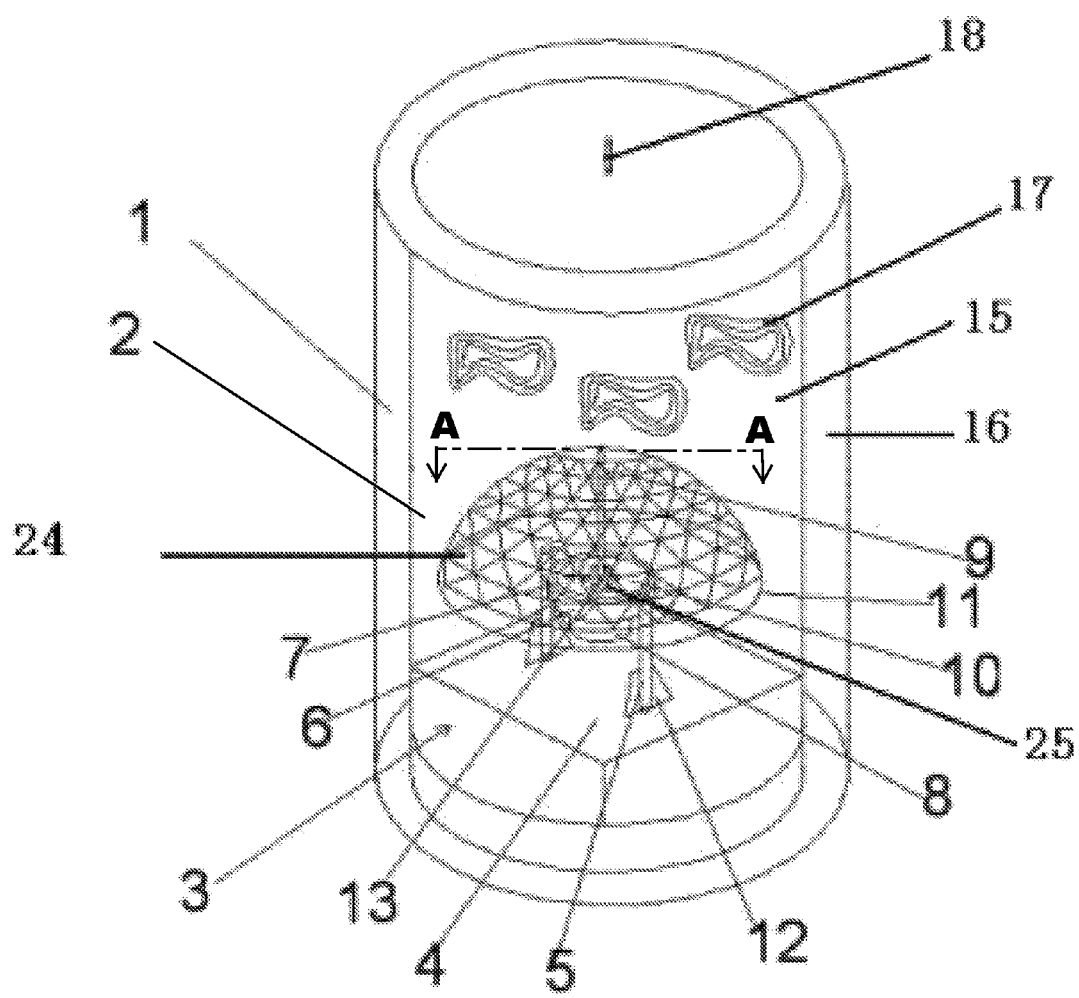
FIG. 1 is a schematic diagram of a structure of a first disclosed embodiment of the invention.

As shown in FIG. 1, a rotary electronic candle is provided, a rotary hemispherical cover at the upper end of a candle wick is matched with a chromatic lamp to form dynamically changing light, meanwhile together with changing patterns on the candle body, dynamic and stereoscopic light change is formed, and a fashion sense is increased while lighting on the whole.

The rotary electronic candle includes a candle body 1, wherein the candle body 1 is provided with a hollow cavity 2, a candle wick 3 is filled in the hollow cavity 2, the candle body 1 is provided with an inner layer 15 and an outer layer 16, the inner layer 15 is of a nonopaque ceraceous structure, the outer layer 16 is made from plastic, glass, acrylic or ceramic with a mirror surface effect, and a variety of nonopaque dynamic graphics 17 are spray coated on the surface of the outer layer 16, an optical fiber lamp wick 18 is arranged at the center of the upper end face of the candle body 1, a through hole is formed in the lower end of the candle body 1, the candle wick 3 is inserted into the hollow cavity 2 from the through hole in the lower end of the candle body 1.

The candle wick 3 includes a battery box base 4, a plurality of fixing columns 5, a motor fixing ring 6, a cover plate 7, a motor 8, a rotating shaft 9, a light source plate 10 and a hemispherical cover 11, wherein the battery box base 4 is fixed on the lower end face of the candle body 1 through a fastener 19, a switch 26 is installed on the lower end face of the battery box base 4, the fixing columns 5 are fixed at the upper end face of the battery box base 4, reinforcing ribs 12 are arranged on both sides of each fixing column to effectively reinforce the firmness of the fixing column, the motor fixing ring 6 is located between the plurality of fixing columns 5 and is fastened by a fastener 19, the cover plate 7 is covered on the upper end face of the motor fixing ring 6 and is clamped by a clamping element 20, a through hole 13 is formed in the center of the cover plate 7, the motor 8 is installed in the motor fixing ring 6, the rotating shaft 9 is connected with the motor shaft of the motor 8 and penetrates through the through hole 13, the light source plate 10 is of an annular structure, six LED lamps 25 in two groups are arranged on the light source plate, the light source plate 10 is fixed on the cover plate 7 and is connected with a battery box and the switch 26 through a power line 21, the rotating shaft 9 is inserted into the middle of the light source plate 10, the upper end of the rotating shaft 9 is of an internal thread structure 22, the hemispherical cover 11 is screwed and installed above the rotating shaft 9 through a screw 23 and covers the light source plate 10 therein, the hemispherical cover 11 is formed by a plurality of triangles 24 which are bent and spliced in different angles, such that light irradiated thereon is refracted and reflected towards different directions, and with the rotation of the hemispherical cover 11, the refracted light continuously rotates.

In the rotary electronic candle disclosed by the invention, the rotating shaft is driven by the motor to rotate, so as to drive the hemispherical cover to rotate, the light emitted by the LED lamps 25 in the hemispherical cover is refracted to different directions, and the refracted light dynamically changes with the rotation of the hemispherical cover, so that the light penetrating through the candle body is matched with the dynamic patterns on the outer layer 16 to create a dynamic lighting effect.

Embodiment 2

Figure 2:
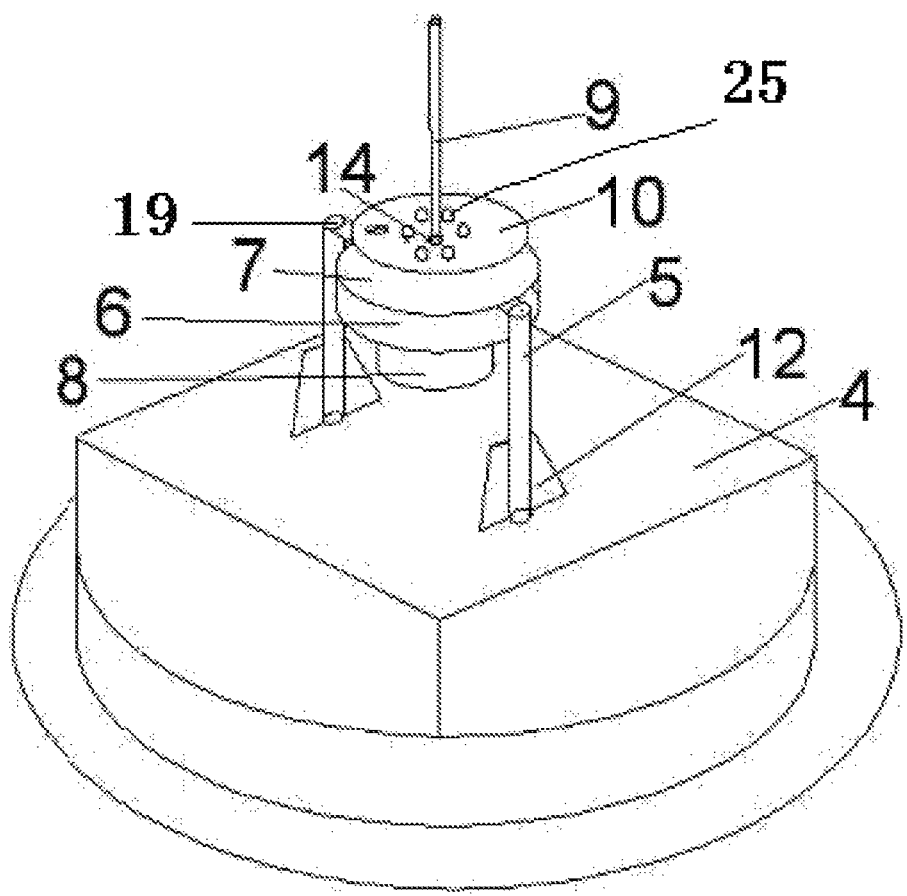
FIG. 2 is a local schematic diagram of a light source plate in a second disclosed embodiment of the invention.
Figure 3:
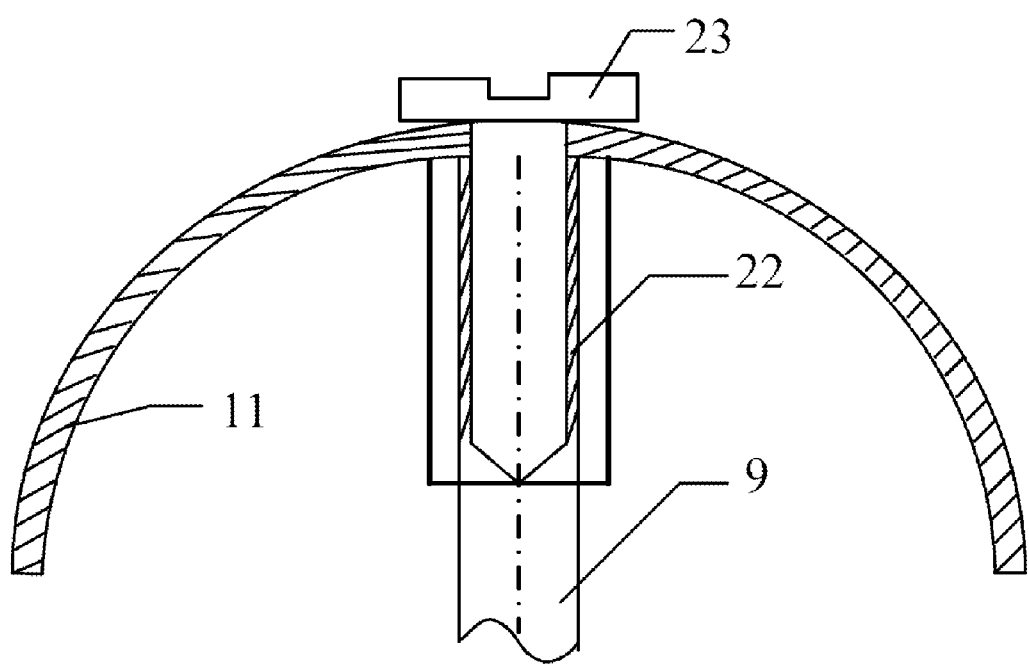
FIG. 3 is a cross sectional view taken along section line A-A of FIG. 1.
Figure 4:
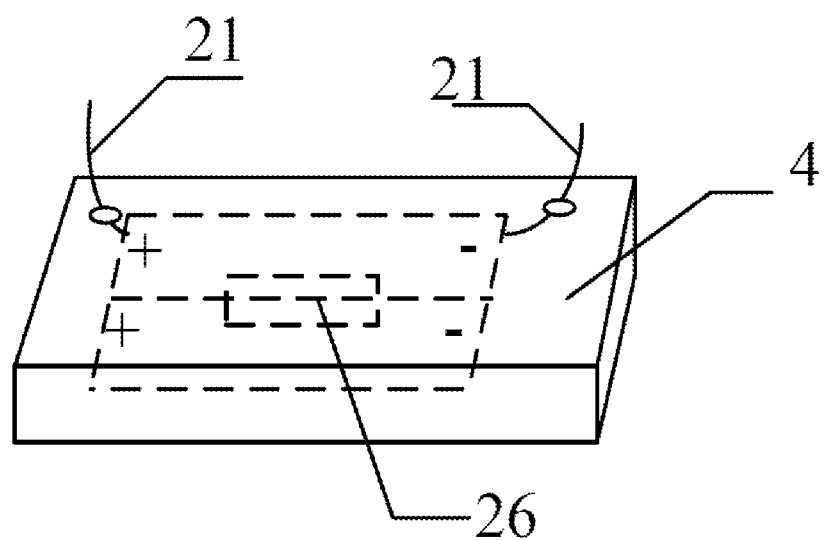
FIG. 4 is perspective view of the battery box base of the electronic candle of FIG. 1.

As shown in FIG. 2, the structural difference of this embodiment with the embodiment of FIG. 1 lies in that a gear 14 is arranged on the rotating shaft 9, the light source plate 10 is of an annular structure, the inner wall of the light source plate is in the shape of a sawtooth engaged with the gear 14, a limiting pin vertically extends from a position located below the light source plate 10 on the rotating shaft, in an installation process, the light source plate is sleeved on the rotating shaft to ensure the mutual cooperation of the sawtooth-shaped inner wall and the gear, meanwhile the limiting pin is used for limiting up and down, so that the light source plate will rotate with the rotation of the rotating shaft.

The technical contents and technical features of the invention have been disclosed above, however, one of skill in the art could make substitutions and modifications based on the teachings and disclosures of the invention without deviating from the spirit of the invention. Therefore, the scope of the invention should not be limited to the contents disclosed in the embodiments, but should include substitutions and modifications not deviating from the invention and be encompassed within the claims of the present patent application.

The invention claimed is:

1. A rotary electronic candle, comprising:
a candle body having an upper end and a lower end, wherein a hollow cavity is arranged in the candle body; and
a candle wick contained in the hollow cavity, wherein the candle wick comprises a battery box base having an upper end and a lower end, a plurality of fixing columns, a motor fixing ring having an upper end and a lower end, a cover plate, a motor, a rotating shaft having an upper end and a lower end, a light source plate and a hemispherical cover,
wherein the plurality of fixing columns are fixed at the upper end of the battery box base, the motor fixing ring is located between the plurality of fixing columns and is fastened by a fastener, the cover plate is covered on the upper end of the motor fixing ring, a through hole is formed in the center of the cover plate, the motor is installed in the motor fixing ring, the rotating shaft is connected with the motor shaft of the motor and penetrates through the through hole, the light source plate is fixed on the cover plate and is connected with a battery box through a power line, the upper end of the rotating shaft is of an internal thread structure, and the hemispherical cover is screwed and installed above the rotating shaft through a screw and covers the light source plate therein.

2. The rotary electronic candle of claim 1, wherein the battery box base is fixed to the lower end of the candle body by a fastener, and a switch is installed on the lower end of the battery box base.

3. The rotary electronic candle of claim 1, wherein reinforcing ribs are arranged on both sides of each fixing column.

4. The rotary electronic candle of claim 1, wherein the light source plate is of an annular structure, six LED lamps in two groups are arranged on the light source plate, and the rotating shaft is inserted into the middle of the light source plate.

5. The rotary electronic candle of claim 1, wherein the hemispherical cover is formed by a plurality of triangles which are bent and spliced in different angles, such that light irradiated thereon is refracted and reflected towards different directions, and with the rotation of the hemispherical cover, the refracted light continuously rotates.

6. The rotary electronic candle of claim 1, wherein the candle body is provided with an inner layer and an outer layer, the inner layer is of a nonopaque ceraceous structure, the outer layer is made from plastic, glass, acrylic or ceramic with a mirror surface effect, and a variety of nonopaque graphics are spray coated on the surface of the outer layer.

7. The rotary electronic candle of claim 1, wherein an optical fiber lamp wick is arranged at the center of the upper end of the candle body, a through hole is formed in the lower end of the candle body, the candle wick is inserted into the hollow cavity from the through hole in the lower end of the candle body, and the optical fiber lamp wick is connected with the light source plate.

* * * * *